US007831333B2

(12) United States Patent
Sawodny et al.

(10) Patent No.: US 7,831,333 B2
(45) Date of Patent: Nov. 9, 2010

(54) METHOD FOR THE AUTOMATIC TRANSFER OF A LOAD HANGING AT A LOAD ROPE OF A CRANE OR EXCAVATOR WITH A LOAD OSCILLATION DAMPING AND A TRAJECTORY PLANNER

(75) Inventors: Oliver Sawodny, Breitenbach (DE); Alexander Hildebrandt, Geraberg (DE); Joerg Neupert, Erfurt (DE); Klaus Schneider, Hergatz (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 847 days.

(21) Appl. No.: 11/376,752

(22) Filed: Mar. 14, 2006

(65) Prior Publication Data

US 2007/0219662 A1 Sep. 20, 2007

(51) Int. Cl.
*G06F 7/00* (2006.01)

(52) U.S. Cl. ........................ 700/213; 700/218; 212/272

(58) Field of Classification Search ................. 700/213, 700/218, 245, 250, 253, 256; 212/272, 273, 212/274, 275, 276
See application file for complete search history.

(56) References Cited

U.S. PATENT DOCUMENTS

| | | | | |
|---|---|---|---|---|
| 4,303,166 A * | 12/1981 | Campbell et al. | ........... | 212/233 |
| 6,474,922 B2 * | 11/2002 | Bachman et al. | .............. | 414/21 |
| 7,490,728 B2 * | 2/2009 | Schobesberger | ............ | 212/308 |
| 2004/0164041 A1 * | 8/2004 | Sawodny et al. | ............ | 212/273 |

FOREIGN PATENT DOCUMENTS

| | | |
|---|---|---|
| DE | 2022745 | 11/1971 |
| DE | 1278079 C2 | 1/1975 |
| DE | 3210450 | 10/1983 |
| DE | 3228302 | 2/1984 |
| DE | 3710492 | 10/1988 |
| DE | 3933527 | 4/1991 |
| DE | 69119913 T | 12/1996 |

(Continued)

OTHER PUBLICATIONS

Sawodny et al., Aktives Lastpendeldämpfungssystem für Liebherr-Auslegerdrehkrane, *Crane Specialty Conference*, May 10, 2001.

(Continued)

*Primary Examiner*—Gene Crawford
*Assistant Examiner*—Ramya Prakasam
(74) *Attorney, Agent, or Firm*—Alleman Hall McCoy Russell & Tuttle LLP

(57) ABSTRACT

The invention relates to a method for the transfer of a load hanging at a load rope of a crane or excavator comprising a slewing gear, a luffing mechanism and a hoisting gear comprising a computer-controlled regulator for the damping of the load oscillation which has a trajectory planner, a disturbance observer and a state regulator with a pre-control, wherein the working space is first fixed by selection of two points, with one of the two points being fixed as the destination point by direction presetting by means of the hand lever and with the nominal speeds for the slewing gear and the luffing mechanism being preset by the hand lever signals.

10 Claims, 8 Drawing Sheets

FOREIGN PATENT DOCUMENTS

| | | |
|---|---|---|
| DE | 100 64 182 | 5/2002 |
| DE | 10064182 | 5/2002 |
| DE | 102 33 874 | 2/2004 |
| EP | 0665184 | 8/1995 |
| WO | WO 97/45357 | 12/1997 |
| WO | WO 2004/106215 | 12/2004 |

OTHER PUBLICATIONS

Arnold et al., Anti-sway System for Boom Cranes Based On an Optimal Control Approach *Proceedings of the American Control Conference*, pp. 3166-3171, Jun. 6, 2003.

* cited by examiner

METHOD FOR THE AUTOMATIC TRANSFER OF A LOAD HANGING AT A LOAD ROPE OF A CRANE OR EXCAVATOR WITH A LOAD OSCILLATION DAMPING AND A TRAJECTORY PLANNER

The invention relates to a crane or excavator for the transfer of a load suspended at a load rope comprising a computer-controlled regulator for the damping of the load oscillation and a trajectory planner and in particular to a method for the automatic transfer of the load.

The invention includes load oscillation damping in cranes or excavators which permits a movement of the load suspended at a rope in at least three degrees of freedom. Cranes or excavators of this type have a slewing gear which can be fitted to a traveling gear which serves for the slewing of the crane or excavator. Furthermore, a luffing mechanism is present for the righting or inclining of a boom. Finally, the crane or excavator comprises a hoisting gear for the raising or lowering of the load suspended at the rope. Cranes or excavators of this type are used in the most varied designs. By way of example, harbor mobile cranes, ship cranes, offshore cranes, crawler-mounted cranes or cable-operated excavators can be named here.

When transferring a load suspended at a rope by means of a crane or excavator of this type, oscillations arise which are due, on the one hand, to the movement of the actual crane or excavator but also to external disturbance influences such as wind. In the past, efforts have already been made to suppress sway oscillations in truck-mounted cranes.

DE 127 80 79, for instance, describes an arrangement for the automatic suppression of oscillations of a load suspended by means of a rope at a rope suspension point movable in the horizontal plane on the movement of the rope suspension point in at least one horizontal coordinate, in which the speed of the rope suspension point in the horizontal plane is influenced by a feedback loop in dependence on a parameter derived from the deflection angle of the load rope with respect to final plumb.

DE 20 22 745 shows an arrangement for the suppression of sway oscillations of a load which is suspended by means of a rope at the crab of a crane whose drive is equipped with a speed of revolution device and a travel control device, with a control device which accelerates the crab while taking account of the oscillation period during a first part of the distance covered by the crab and decelerates it during a last part of this distance such that the movement of the crab and the oscillation of the load at the destination become equal to zero.

A device is known from DE 321 04 50 on hoisting machinery for the automatic control of the movement of the load carrier comprising steadying of the sway of the load suspended on it during acceleration or braking during an acceleration time interval or a braking time interval. The basic idea is based on the simple mathematical pendulum. The mass of the crab and of the load is not included in the calculation of the movement. Coulomb friction and speed-proportional friction of the crab or bridge drives are not taken into account.

To be able to transport a load as fast as possible from the starting location to the destination location, DE 322 83 02 proposes controlling the speed of the drive motor of the traveling crab by means of a computer such that the traveling crab and the load carrier are moved at the same speed during the continuous travel and the oscillation damping is achieved in the shortest possible time. The computer known from DE 322 83 02 works according to a computer program for the solution of the differential equations applicable to the undamped two-mass oscillation system formed from the traveling crab and the load, with the Coulomb friction and the speed-proportional friction of the crab or bridge drives not being taken into account.

In the method which has become known from DE 37 10 492, the speed between the destinations on the trajectory are selected such that the pendulum deflection is always equal to zero after covering half the total distance between the starting location and the destination location.

The method which has become known from DE 39 33 527 for the damping of load sway oscillations comprises a normal speed/position control.

DE 691 19 913 deals with a method of controlling the adjustment of a swaying load, wherein the deviation between the theoretical and the real position of the load is formed in a first feedback loop. Said deviation is derived, multiplied by a correction factor and added to the theoretical position of the movable support. In a second feedback loop, the theoretical position of the movable support is compared with the real position, multiplied by a constant and added to the theoretical speed of the movable support.

DE 44 02 563 deals with a method for the control of electrical travel drives of lifting machinery with a load suspended at a rope, said control generating the desired development of the speed of the crane crab on the basis of the equations describing the dynamics and transmits it to a speed and current controller. The computer device can furthermore be expanded to include a position control for the load.

The control methods which have become known from DE 127 80 79, DE 393 35 27 and DE 691 19 913 require a rope angle sensor for the load oscillation damping. This sensor is likewise required in the expanded embodiment of DE 44 02 563. Since this rope angle sensor causes substantial costs, it is of advantage for the load oscillation also to be able to be compensated without this sensor.

The method of DE 44 02 563 likewise at least requires the crane crab speed in the basic version. A plurality of sensors are also required for the load oscillation damping in DE 20 22 745. For instance, at least one speed and position measurement of the crane crab have to be taken in DE 20 22 745.

DE 37 10 492 also requires at least the crab or bridge position as the additional sensor.

Alternatively to this method, another approach, which has become known, for example, from DE 32 10 450 and DE 322 83 02 proposes solving the differential equations underlying the system and, based on this, determining a control strategy for the system to suppress a load oscillation, with the rope length being measured in the case of DE 32 10 450 and the rope length and the load mass being measured in the case of DE 322 83 02. In these systems, however, the friction effects not to be neglected in the crane system of static friction and speed-proportional friction are not taken into account. DE 44 02 563 also does not take any friction terms or damping terms into account.

To further develop a crane or excavator for the transfer of a load suspended at a load rope which can move the load over at least three degrees of freedom of movement such that the oscillating movement of the load actively occurring during the movement can be damped and the load can be guided so precisely on a predetermined trajectory, the applicant has already proposed in its DE 100 64 182 A1 to equip the crane or excavator with a computer-controlled regulator for the damping of the load oscillation which has a trajectory planning module (hereinafter a trajectory planner), a centripetal force compensation device and at least one axis controller for the slewing gear, one axis controller for the luffing mechanism and one axis controller for the hoisting gear.

When transferring loads, it is necessary to travel to two destination points as fast as possible and with as precise a position as possible with the crane or excavator, for example harbor mobile crane. One of the destination points lies in the object to be unloaded, the other in the object to be loaded. A largely automated transfer of the loads is designated a so-called teach-in operation.

It is the object of the invention to provide a method for the implementation of the so-called teach-in operation for cranes or excavators, in particular harbor mobile cranes.

The solution results from the combination of the features of the main claim.

Special aspects of the invention result from the dependent claims.

The fully automatic trajectory planner forms part of an active load oscillation damping system for a harbor mobile crane. The demand on the crane operator to move to two points in the operating space a multiple of times serves as the starting point for the development of the fully automatic operation. As shown in FIG. 1, these two points are defined by the crane operator. Depending on the predetermined direction by the hand lever, one of the two points is determined as the destination point. The aim is to move as fast as possible and with as precise a position as possible to the destination point and to minimize the load oscillation. Furthermore, the nominal speeds for the slewing gear and the luffing mechanism are preset by the hand lever signals. The crane operator thus maintains the control of the harbor mobile crane even in fully automatic operation. Obstacles which are located in the working space can be moved around since the load can be moved freely in the whole working space without being bound to a specific trajectory. In this process, the active load oscillation damping—as described in the patent application DE 100 64 182 A1—provides the minimization of the load oscillation. If it is necessary to leave the working space, the crane operator must actuate a corresponding button. High transfer performances are achieved and the demands on the crane operator are minimize by this operating mode, the so-called teach-in mode. In addition, in fully automatic operation, the crane behaves approximately as in semi-automatic operation in which the hand lever signal is used for the crane control and the active load oscillation damping provides the minimization of the load oscillation. The dynamic behavior of the crane thus remains calculable and as customary for the crane operator.

Further details and advantages of the invention will be explained in more detail in the following with reference to the Figures.

The control of the crane is realized by underlying oscillation damping (DE 100 64 182 A1). The partial structures for the slewing gear and the luffing mechanism essentially consist of the trajectory generation, the disturbance observers and the state controllers with pre-control (see FIG. 2). In fully automatic operation, both the lever signal $\dot{\phi}_{DZiel}$ and $\dot{r}_{ALZiel}$ and the starting points/destination points in the working space are evaluated. Modified reference signals for the load speed in the direction of rotation and in the radial direction are calculated using this information. Nominal trajectories are generated from the reference signals in the trajectory planners and are implemented in a pre-controlled manner in the axis controllers for the slewing gear and the luffing mechanism into the corresponding control voltages for the hydraulic drives.

Figure 1:
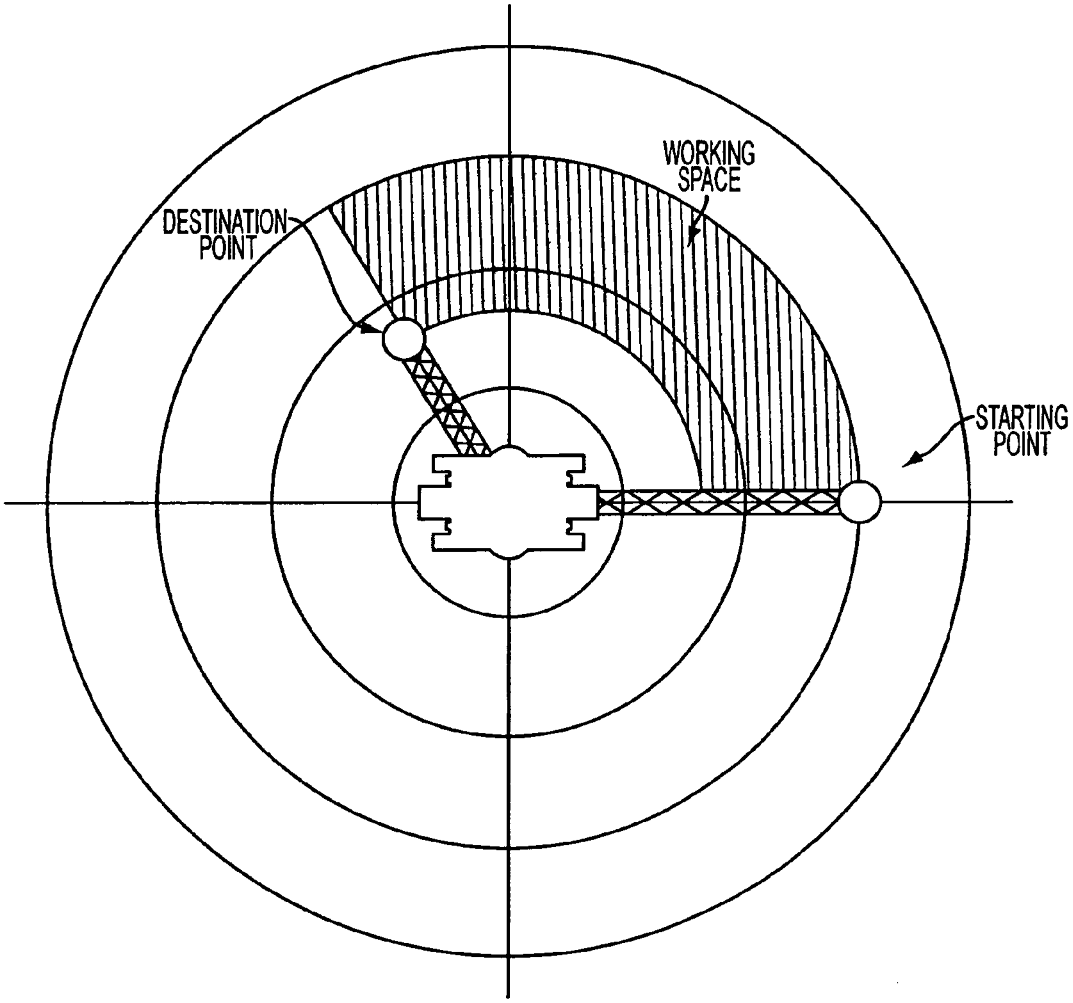
FIG. 1 is a top view of an example working space.
Figure 2:
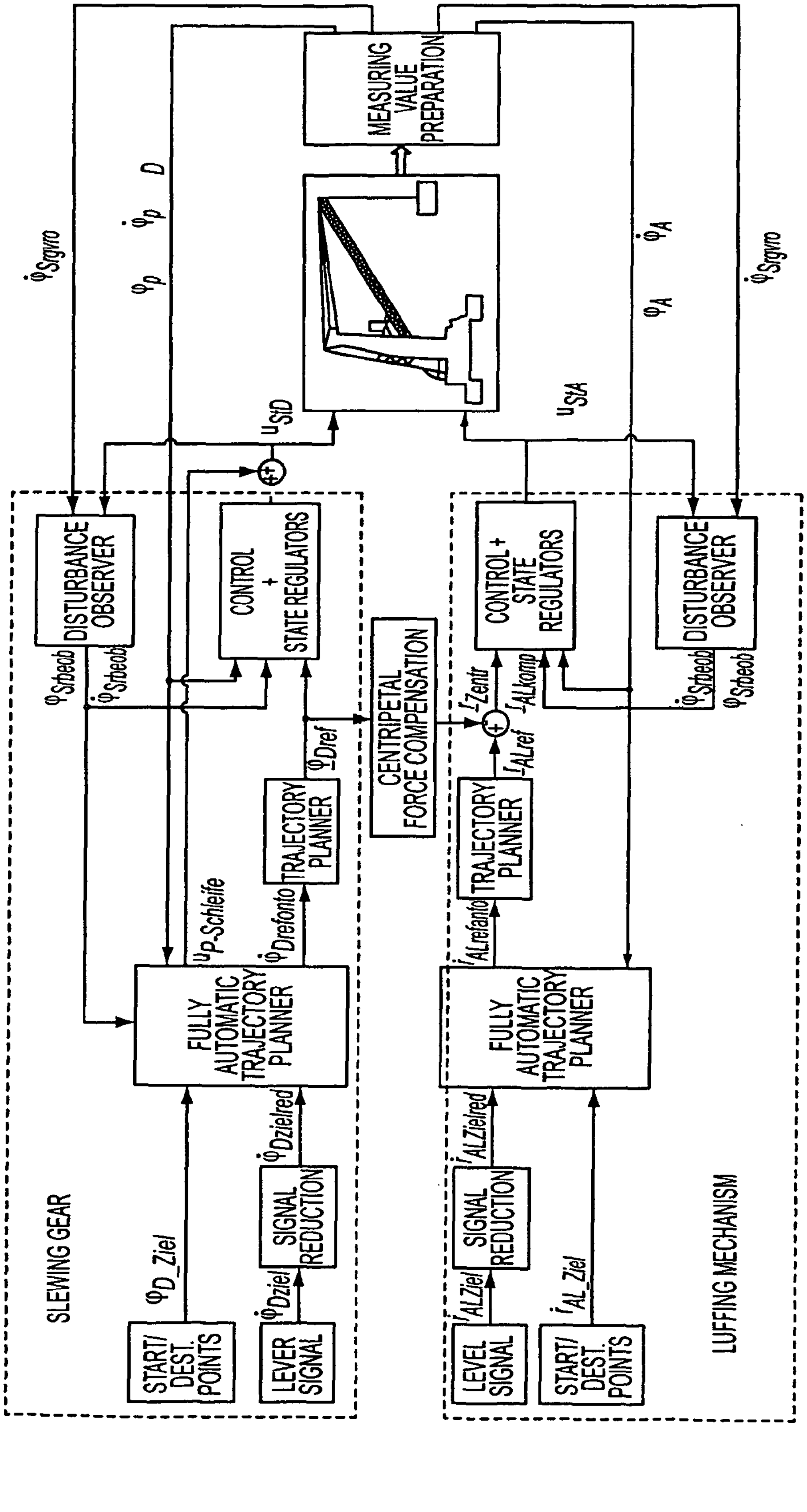
FIG. 2 is an example mechanism for a teach-in operation.

As shown in FIG. 1, the two points in the working space fixed by the crane operator are projected into the $\phi_D$-$r_{AL}$ plane. The nominal positions of the load can thus be separated into the components $\phi_{D\_Ziel}$ and $r_{AL\_Ziel}$. FIG. 2 shows the taking into account of these components in the axis controllers for the slewing gear and the luffing mechanism. Depending on the deflection of the hand lever, the nominal position disposed to the right or to the left of the crane operator is preset as the destination point and separated into the just recited components.

Figure 3:
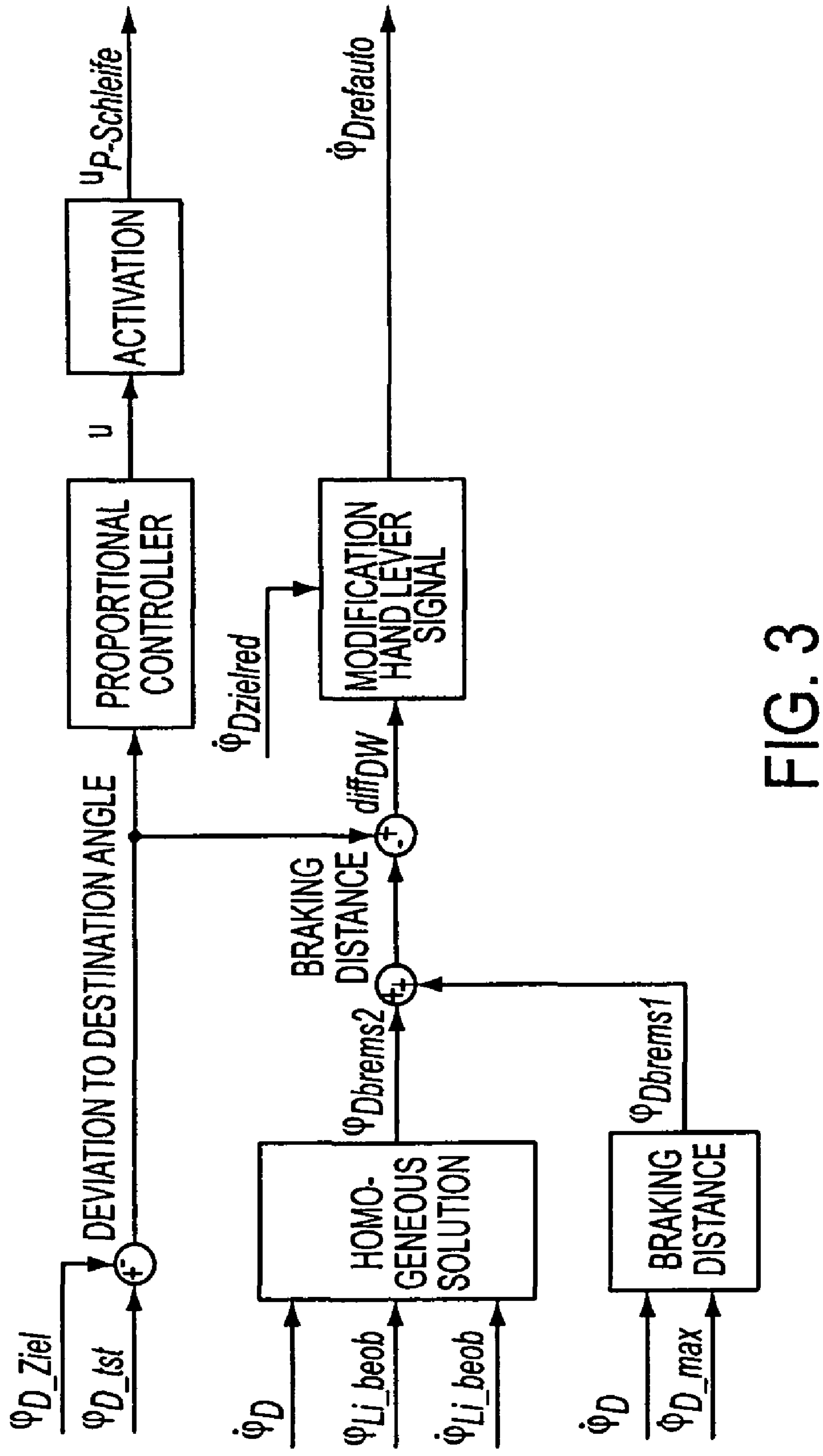
FIG. 3 is an example mechanism for a fully automatic trajectory planner.

The Structure and Action of the Fully Automatic Trajectory Planner for the Slewing Gear:

The basic idea of the fully automatic trajectory planner is the modification of the reduced hand lever signal in dependence on the remaining rotation range up to the destination position $\phi_{D\_Ziel}$ and the required braking path. On a deflection of the hand lever by the crane operator, acceleration first takes place with the ramp stored in the trajectory planner. If the remaining rotation range is larger than the angle of rotation required for the deceleration, a phase follows in which travel takes place with a preset maximum speed. On the other hand, the braking phase directly follows the acceleration phase if the rotation range is correspondingly small. As shown in FIG. 3, the remaining range must first be determined by the difference between the nominal position and the actual position. To find the correct point in time from which deceleration must take place, the required braking distance is taken into account. Depending on the direction of rotation, the difference between the remaining rotation range and the braking distance becomes negative or positive at precisely the correct time of deceleration. To improve the behavior of the harbor mobile crane when moving to the destination position, the reduced hand lever signal $\dot{\phi}_{DZielred}$ is not set at zero only on the reaching of the time of deceleration, but already on the approaching of this point in time via an adapted look-up table.

Figure 4:
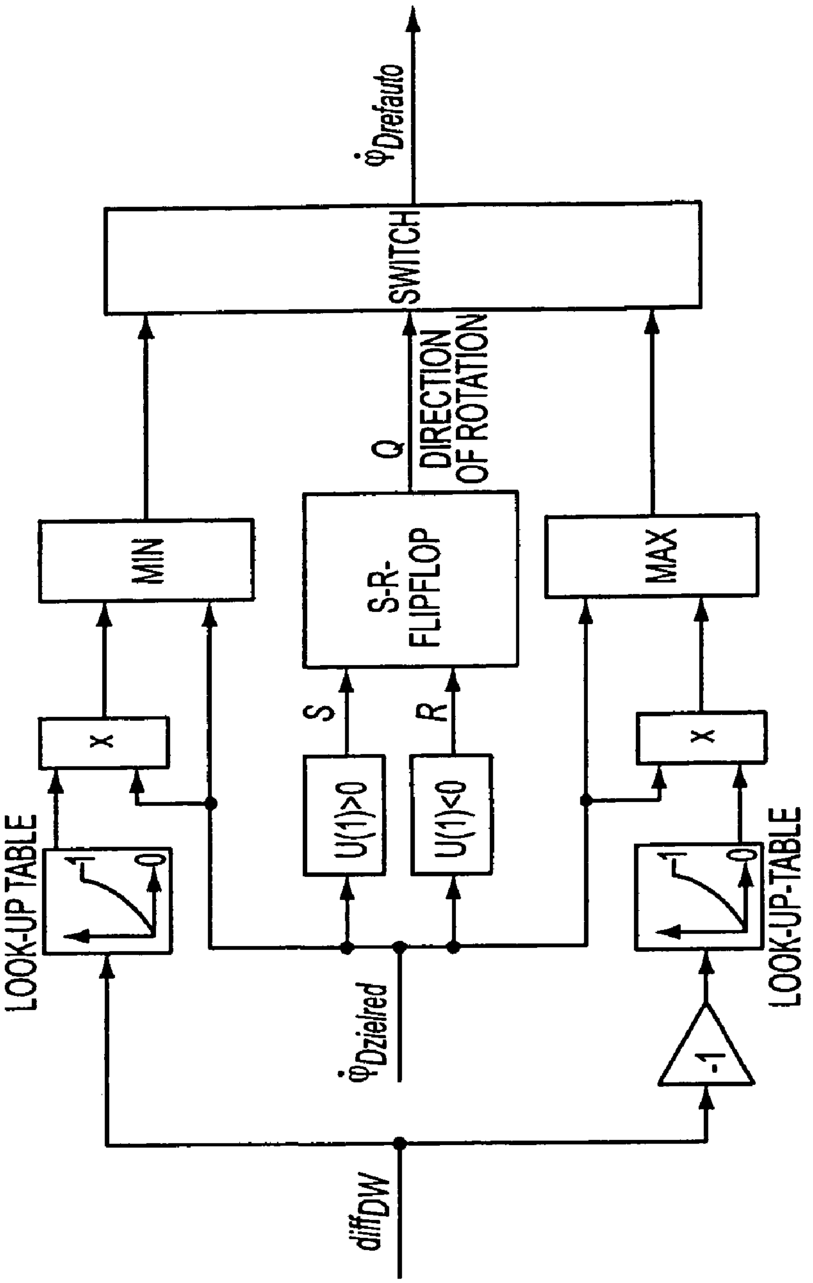
FIG. 4 is an example mechanism for a modified hand lever signal.

As shown in FIG. 4, the direction of rotation is first fixed in the block "Modification of hand lever signal" using the sign of the reduced hand lever signal $\dot{\phi}_{DZielred}$. To make the fully automatic trajectory planner robust with respect to changes in rope length, the crane already starts to brake before the reaching of the actual time of deceleration. The difference between the position difference and the braking distance is converted to factors between zero and one via look-up tables. If the distance up to the time of deceleration, that is the angle of rotation from which braking must start to reach the target angle, is larger than 25 degrees, the reduced hand lever signal is weighted as one and converted into nominal trajectories in the trajectory planner. If the distance reduces, the hand lever signal is reduced in a non-linear manner. If the signal $diff_{DW}$ becomes negative, the factor with which the reduced hand lever signal is weighted, becomes zero and the time of deceleration has thus been reached.

Figure 5:
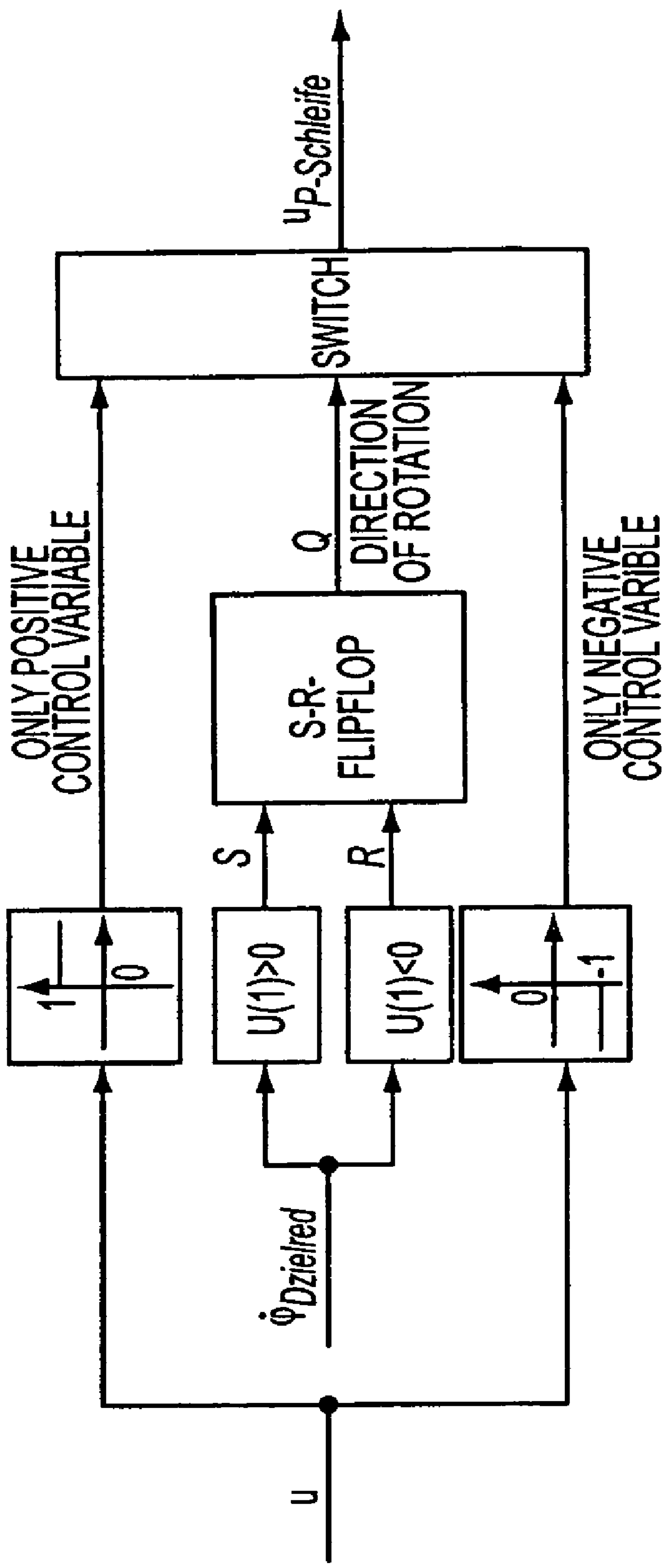
FIG. 5 is an example mechanism for a proportional controller.

Since the state controller for the slewing gear does not have any position binding, that is the angle of rotation $\phi_D$ is not restored, a proportional controller is implemented which restores the position difference. The control variable of the proportional controller is, however, only applied when the destination point has been moved over (see FIG. 5). The reaching of the target angle can thus be guaranteed for $t \to \infty$. The amplification of the proportional controller is set with reference to a fixed factor $P_{Faktor}$ which is weighted with the absolute value of the hand lever signal. The hand lever signal is normed from −1 to 1. The proportional controller is thus adapted to the dynamics of the system.

The basis for the calculation of the braking distance forms the general solution of the state space model of the regulated partial system of the slewing gear. The solution of the equations of state is divided into two parts, the homogeneous solution and the particular solution. The particular solution can be approximated for the slewing gear by the relationship shown in equation (0.1). The first part of the braking distance $\phi_{Dbrems1}$ is calculated by the taking account of the measured speed of rotation $\dot{\phi}_D$ and the maximum acceleration $\ddot{\phi}_{D\_max}$.

$$\varphi_{Dbrems1} = \frac{\dot{\varphi}_D^2}{2 \cdot \ddot{\varphi}_{D\_max}} \tag{0.1}$$

The second portion of the braking distance $\phi_{Dbrems2}$ results from the calculation of the homogeneous solution of the regulated partial system of the slewing gear.

The Homogeneous Solution of the Regulated Partial System of the Slewing Gear:

The oscillation damping of the load implemented for the slewing gear in the tangential direction results in compensatory movement of the crane in the direction of rotation. The dynamics of the state control, fixed by the pole positions, has a decisive influence on the required braking distance of the slewing gear. To determine the angle of rotation which results on a deflection of the regulated system, the homogeneous solution of this system is calculated. With the homogeneous solution shown in equation (0.2), all states can be determined by measurement of the initial states.

$$\underline{x}_{hom}(t) = e^{\underline{A}_R(t-t_0)} \cdot \underline{x}(t_0) \tag{0.2}$$

where $\underline{A}_R$ is the system matrix of the regulated system. The state vector and the input vector result as the following with the four states of angle of rotation, speed of angle of rotation, tangential rope angle and tangential rope angle speed and the control voltage of the proportional valve of the hydraulic circuit as the input $$\underline{x}_D = [\phi_D \ \dot{\phi}_D \ \phi_S \ \dot{\phi}_{St}]^T; \underline{u} = u_{stD} \tag{0.3}$$

With these definitions, the state space of the slewing gear is as follows $$\dot{\underline{x}}_D = \underbrace{\begin{bmatrix} 0 & 1 & 0 & 0 \\ 0 & -\frac{1}{T_D} & 0 & 0 \\ 0 & 0 & 0 & 1 \\ 0 & \frac{a}{T_D} & -\frac{g}{l_S} & 0 \end{bmatrix}}_{\underline{A}_D} \cdot \underline{x}_D + \underbrace{\begin{bmatrix} 0 \\ b \\ 0 \\ -a \cdot b \end{bmatrix}}_{\underline{B}_D} \cdot \underline{u}_D \tag{0.4}$$

$$\text{where } a = \frac{l_A \cdot \cos(\varphi_A)}{l_S} \text{ and } b = \frac{K_{VD} \cdot 2 \cdot \pi}{i_D \cdot V_{MD} \cdot T_D}$$

Where $l_A$ is the boom length, $l_S$ the free oscillation length, $i_D$ a transmission ratio, $V_{MD}$ the displacement volume of the hydraulic motors, $T_D$ the deceleration time of the hydraulic drive. $K_{DV}$ the proportionality constant between the control voltage and the conveying flow of the pump, and $\phi_A$ the righting angle of the boom. The output of the system is the radius of the load. The starting matrix $\underline{C}_D$ is thus given by $$\underline{C}_D = \begin{bmatrix} 1 & 0 & \frac{l_S}{\cos(\varphi_{A0}) \cdot l_A} & 0 \end{bmatrix} \tag{0.5}$$

To be able to calculate the angle of rotation resulting from the deflection of the regulated system, equation (0.2) must be solved for the first state ($\phi_D$). For this purpose, the matrix of the regulated system is first calculated using the feedback matrix $\underline{K} = [0 \ k_2 \ k_3 \ k_4]$, whose elements are determined by pole presetting. (Equation (0.6)). The first amplification of the feedback matrix is zero since one of the four poles is preset at zero and the state regulation of the slewing gear thus has no position binding.

$$\underline{A}_R = \begin{bmatrix} 0 & 1 & 0 & 0 \\ 0 & -\frac{1}{T_D} - b \cdot k2 & -b \cdot k3 & -b \cdot k4 \\ 0 & 0 & 0 & 1 \\ 0 & \frac{a}{T_D} + a \cdot b \cdot k2 & -\frac{g}{l_S} + a \cdot b \cdot k3 & a \cdot b \cdot k4 \end{bmatrix} \tag{0.6}$$

If one now calculates the transition matrix $\underline{\Phi} = e^{\underline{A}_R(t-t_0)}$ and observes the limit value for $t \to \infty$, the following elements of the first line result.

$$\phi_{11} = 1 \tag{0.7}$$

$$\phi_{12} = \frac{-\left( \begin{array}{c} l_1 \cdot l_2 \cdot T_D^2 + l_1 \cdot T_D + \\ l_1 \cdot T_D^2 \cdot b \cdot k2 + l_1 \cdot l_3 \cdot T_D^2 + \\ l_2 \cdot T_D + l_2 \cdot T_D^2 \cdot b \cdot k2 + l_2 \cdot l_3 \cdot T_D^2 - \\ T_D^2 \cdot b^2 \cdot a \cdot k_2 \cdot k_4 + 2 \cdot T_D \cdot b \cdot k_2 - \\ T_D \cdot b \cdot a \cdot k_4 + T_D^2 \cdot b^2 \cdot k_2^2 + 1 + \\ l_3 \cdot T_D + l_3 \cdot T_D^2 \cdot b \cdot k_2 \end{array} \right)}{(l_1 \cdot l_2 \cdot l_3 \cdot T_D^2)}$$

$$\phi_{13} = \frac{-\left( \begin{array}{c} l_1 \cdot T_D \cdot k_3 + l_2 \cdot T_D \cdot k_3 + k_3 + \\ T_D \cdot b \cdot k_2 \cdot k_3 + T_D \cdot \frac{g}{l_S} \cdot k_4 - \\ T_D \cdot b \cdot a \cdot k_3 \cdot k_4 + l_3 \cdot T_D \cdot k_3 \end{array} \right) \cdot b}{(l_1 \cdot l_2 \cdot l_3 \cdot T_D)}$$

$$\phi_{14} = \frac{-\left( \begin{array}{c} l_1 \cdot T_D \cdot k_4 + l_2 \cdot T_D \cdot k_4 + k_4 + \\ T_D \cdot b \cdot k_2 \cdot k_4 - T_D \cdot k_3 - \\ T_D \cdot b \cdot a \cdot k_4^2 + l_3 \cdot T_D \cdot k_4 \end{array} \right) \cdot b}{(l_1 \cdot l_2 \cdot l_3 \cdot T_D)}$$

The three remaining poles of the regulated partial system of the slewing gear which are not equal to zero, are symbolized by $l_1$, $l_2$ and $l_3$.

The homogenous solution of the regulated system for the angle of rotation can be determined with the equation (0.2) and the elements of the transition matrix. The relationship is shown in equation (0.8).

$$\phi_{Dhom} = \phi_{11} \cdot \phi_D + \phi_{12} \cdot \dot{\phi}_D + \phi_{13} \cdot \phi_S + \phi_{14} \cdot \dot{\phi}_S \tag{0.8}$$

It is possible by this calculation to take account of the dynamic properties of the slewing gear control in the fully automatic trajectory planning. The angle of rotation $\phi_{Dhom}$ is calculated dynamically and understood as an additional portion $\phi_{Dbrems2}$ of the braking distance. It is thus possible to generate trajectories which result in the correct moving to the destination point.

Figure 6:
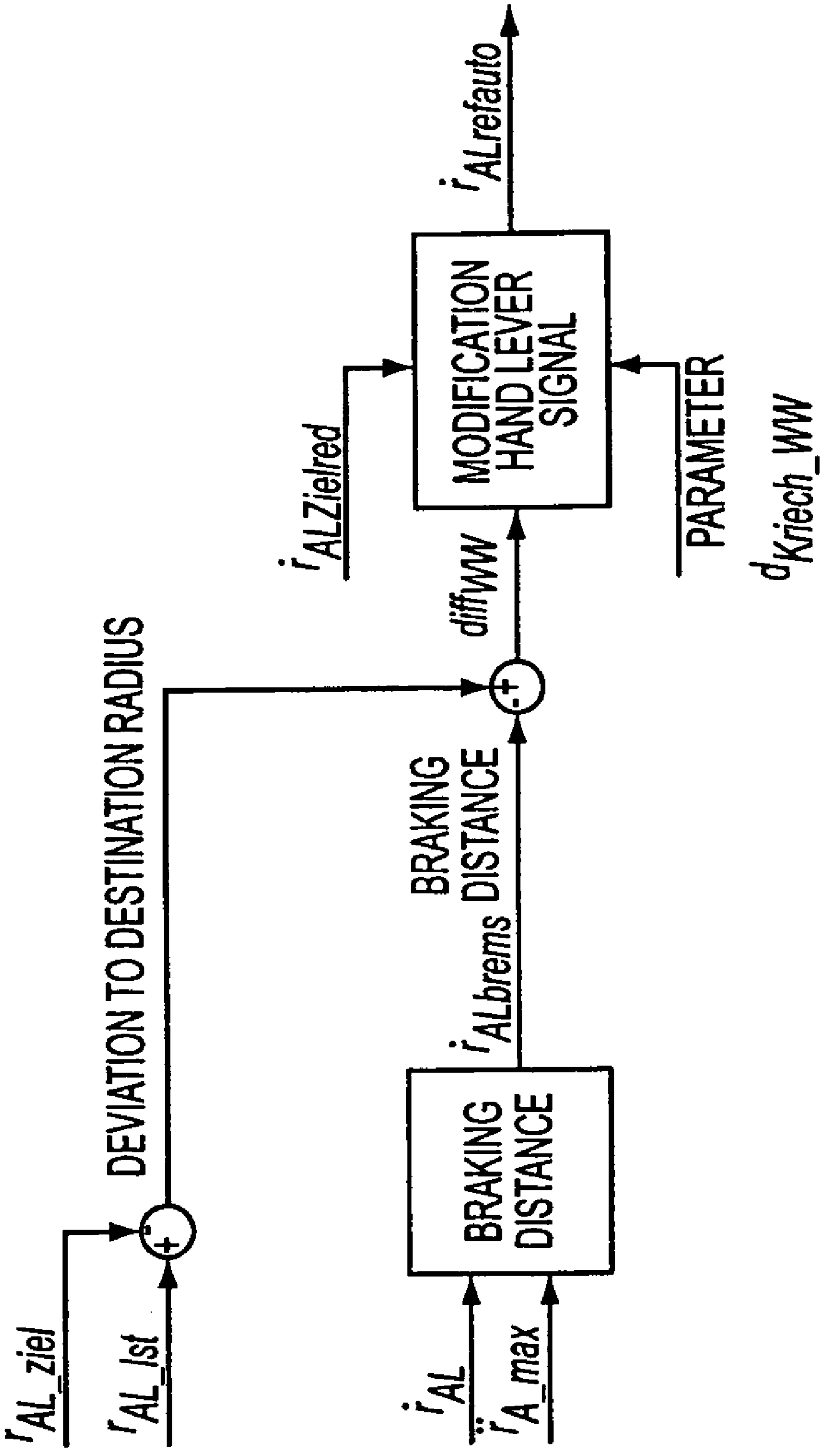
FIG. 6 is another example for a fully automatic trajectory planner.

The Structure and Action of the Fully Automatic Trajectory Planner for the Luffing Mechanism:

In contrast to the regulation of the slewing gear, the righting angle of the boom $\phi_A$ is restored for the luffing mechanism. The reaching of the predetermined position for $t\rightarrow\infty$ can thus be guaranteed by the approach of the state controller with position binding and the fully automatic trajectory planner is substantially simplified (see FIG. 6). Analog to the slewing gear trajectory planer, the reduced hand lever signal $\dot{r}_{ALZielred}$ is adapted in the block "Modification of Hand Lever Signal" such that the movement of the luffing mechanism is decelerated at the correct time to reach the destination position. The modified nominal speed development of the load in the radial direction generated in the fully automatic operation is converted in the trajectory planner, as shown in FIG. 2, into the nominal trajectory $\underline{r}_{ALref}$.

Figure 7:
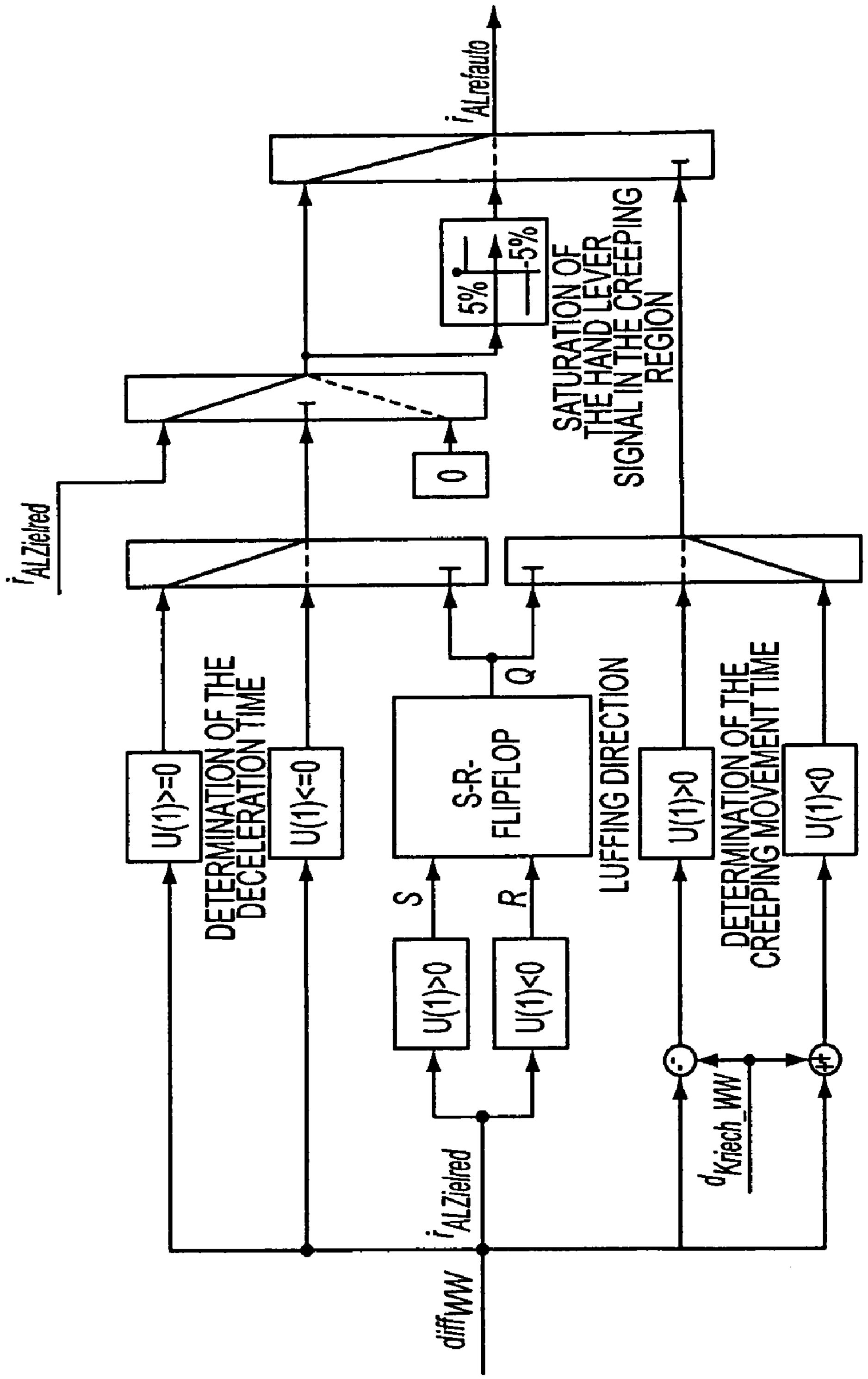
FIG. 7 is another example mechanism for a modified hand lever signal.

The deceleration time $t_{Verzögerung}$ is obtained in this process by direction-dependent evaluation of the sign of the difference between the deviation from the destination radius and the required braking distance (see FIG. 7). To increase the precision of the positioning and to minimize the overshooting, a so-called creeping region is additionally introduced. In this region, five percent of the maximum speed is preset. The time $t_{Kriech}$ is determined with reference to the parameter $d_{Kriech\_WW}$ shown in FIG. 6. By addition or subtraction of the parameter from the difference of the position deviation and of the braking distance and with the aid of a direction-dependent evaluation of the sign, one obtains the time $t_{Kriech}$.

Figure 8:
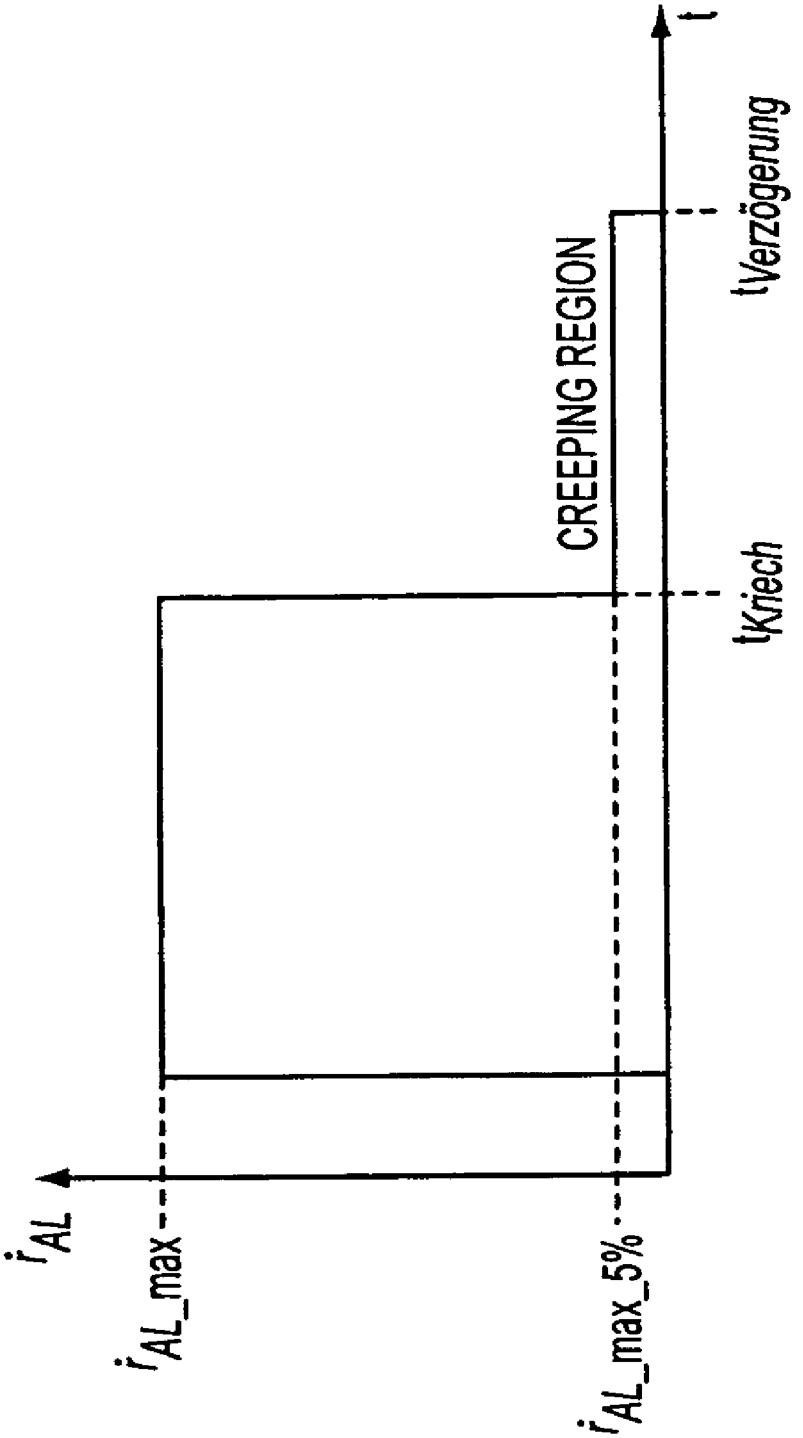
FIG. 8 is a schematic of an example modified hand lever signal.

The creeping movement time $t_{Kriech}$ serves as the basis for the decision when the reduced hand lever signal is modified from the preset maximum speed to five percent of the maximum speed. The curve of the modified hand lever signal shown schematically in FIG. 8 is thus obtained.

The braking distance of the luffing mechanism is determined by inclusion of the current speed and of the maximum acceleration of the boom in the radial direction as follows:

$$r_{ALbrems} = \frac{\dot{r}_{AL}^2}{2 \cdot \ddot{r}_{A\_max}} \tag{0.9}$$

The taking account of the dynamics of the regulated system in the form of the homogeneous solution of the system and a position deviation restored via a proportional controller is not necessary since the axis regulator of the luffing mechanism is position bound.

The invention claimed is:

1. A method for the transfer of a load hanging at a load rope of a crane or excavator having at least a slewing gear to rotate the crane or excavator, a luffing mechanism to right or incline a boom and a hoisting gear to raise or lower the load suspended at the rope, a computer-controlled regulator for damping load oscillation which has a trajectory planner, a disturbance observer and a state regulator with a pre-control, the method comprising the following steps:

fixing a working space by selection of two points including a first point and a second point;

fixing the second point as a destination point by direction presetting by means of a hand lever;

presetting of nominal speeds for the slewing gear and luffing mechanism by hand lever signals, the load being freely movable in the whole working space and not bound to a specific trajectory, wherein the load moves from the first point to the second point, and during the movement the preset nominal speeds adjust the trajectory of the load.

2. The method according to claim 1, further comprising fixing the first point as a starting point, wherein the hand lever signals, starting point, and destination point in the working space are evaluated; and modified reference signals are calculated on a basis of an evaluation for a load speed in a direction of rotation and in a radial direction, wherein nominal trajectories are generated from the modified reference signals in the trajectory planner and are implemented in a pre-controlled manner in axis regulators for the slewing gear and luffing mechanism into corresponding control voltages for drives.

3. The method according to claim 2, wherein a nominal position of the load is divided into components which are each taken into account in the axis regulator for the slewing gear or the luffing mechanism.

4. The method according to claim 3, wherein, in the trajectory planner, the hand lever signals are modified in dependence on a remaining rotational range up to the destination point and on a required braking distance.

5. The method according to claim 3, wherein, in the trajectory planner, the hand lever signals are reduced hand lever signals and are adapted such that movement of the luffing mechanism is decelerated to reach the destination point.

6. The method according to claim 5, wherein, on the deceleration, a so-called creeping range is provided as a safety range in which the luffing mechanism is slowed down from a maximum speed to a fraction of the maximum speed.

7. The method of claim 6, further comprising adjusting at least one of the slewing gear and the luffing mechanism to retain the load within the working space.

8. The method of claim 1 wherein the load rope is moved between the two points a plurality of times.

9. The method of claim 1 wherein an operator actuates a button to leave the working space.

10. The method of claim 1 further comprising automatic modification of the hand lever signals in dependence on a remaining rotation range and/or radial range up to the destination point and a required braking path.

* * * * *